Patented Sept. 14, 1926.

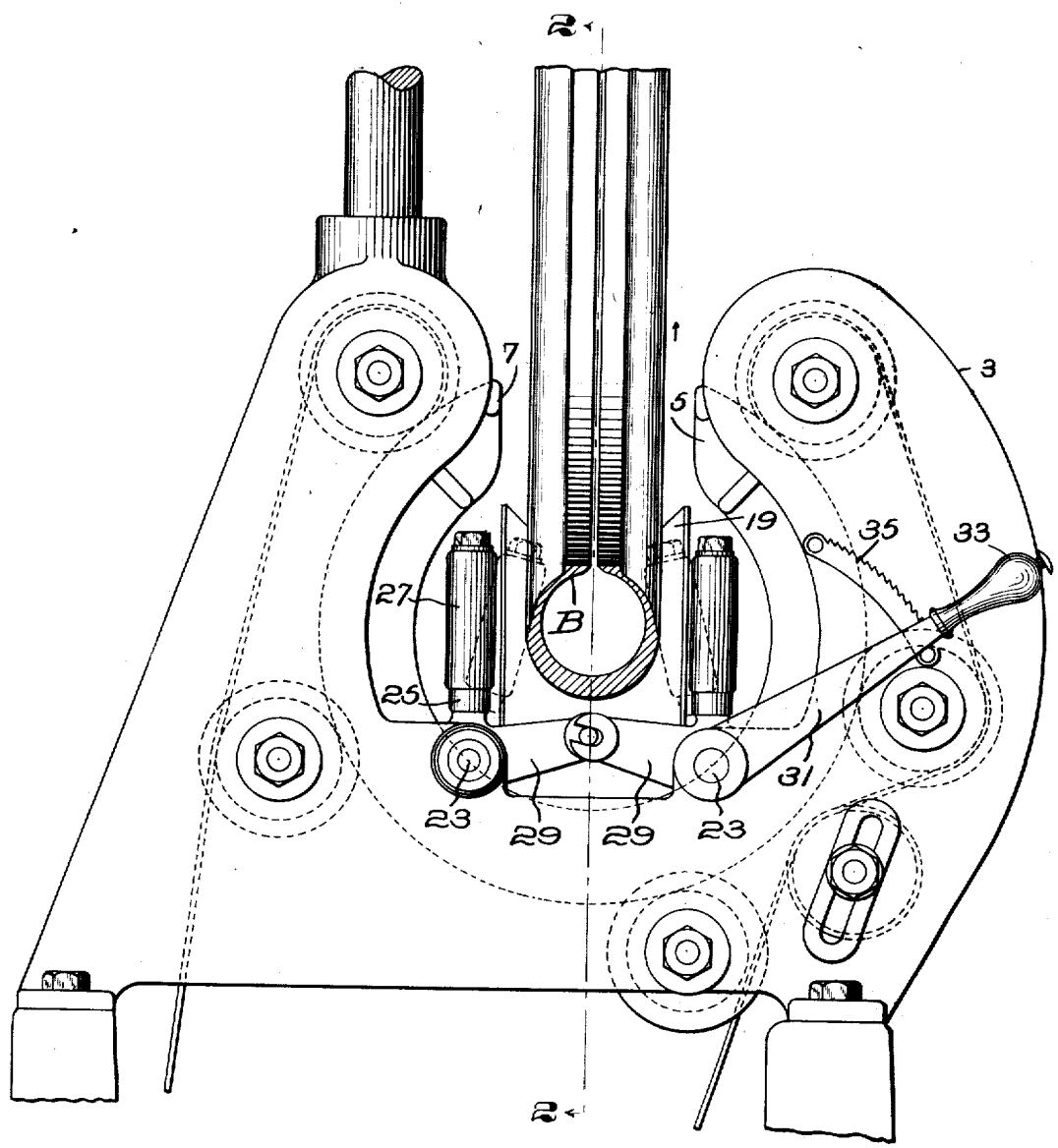

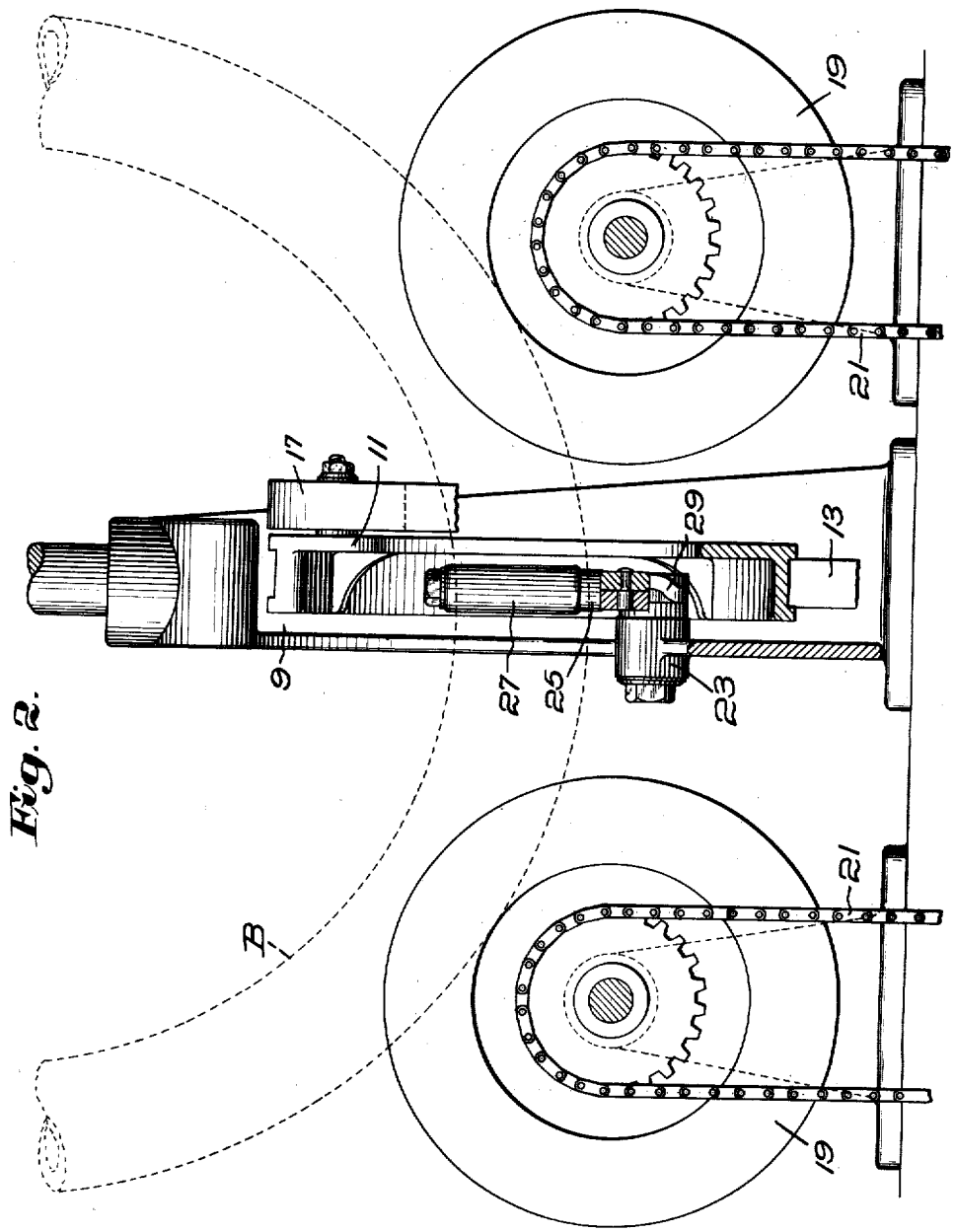

1,599,942

UNITED STATES PATENT OFFICE.

EDWARD H. ANGIER, OF FRAMINGHAM, AND WILLIAM M. WHEILDON, OF ASHLAND, MASSACHUSETTS.

WRAPPING MACHINE.

Application filed April 12, 1919. Serial No. 289,759.

This invention relates to wrapping machines of the type having a rotary shuttle, which are adapted to be used in wrapping annuli and find their chief field of application in the packaging of tire casings or tire shoes for storage or shipment.

Our invention will best be understood by reference to the following description of an illustrative embodiment thereof taken in connection with the accompanying drawings wherein:—

Figure 1 is an end elevation of as much of a tire wrapping machine as it is necessary to show for an understanding of my invention; and Fig. 2 is a side elevation.

Referring to the drawings, the machine shown comprises a suitable frame 3 on which is mounted a rotary shuttle 5 generally annular in form but having a gap 7 through which the tire may be introduced. As best seen in Fig. 2, this shuttle may have a cylindrical portion 9 and an annular portion 11 extending inwardly therefrom in the manner of a flange. The shuttle may be supported in the loop of a driving belt 13 which engages the cylindrical portion 9, the belt being trained around a series of rolls 15 carried by the frame. It will be understood that when power is applied to the driving belt the shuttle is revolved about its own center, carrying with it the roll 17 of wrapping material mounted on the annular face 11.

In the form of the invention herein disclosed, the shuttle is adapted to rotate about the lower portion of a tire supported in vertical position. Herein (see Fig. 2) I provide supporting rolls 19 on opposite sides of the shuttle adapted to engage the exterior periphery of the tire at spaced points, supporting the tire in such position that it may be revolved through the eye of the shuttle in well known manner. The rolls 19 may be driven by sprocket chains 21 to revolve the tire and the result of this feeding movement of the tire and the rotary movement of the shuttle is that the wrapping strip is drawn from the shuttle and applied to the tire as a helical covering. The construction so far described is not in itself new to the present application and needs no extended description.

In Fig. 1 I have shown in position in the machine a tire shoe of the usual form, the section thereof being roughly that of a horseshoe, being split at the inner periphery and provided with bead portions B which, when the tire is in use, engage the rim flanges of the wheel. We have found that in wrapping a tire of this type it is desirable abnormally to press together these beads when the wrapping is being applied, so that the tire will be wrapped under compression but will be permitted to expand after the wrapping is around the same, to tension the package. For this purpose and to obtain other advantages in wrapping tires or other annuli, we have adopted the construction of which an illustrative example is here shown.

In the present embodiment of the invention we mount on rock shafts 23, extending parallel to the plane of the tire when it is in position to be wrapped and on either side thereof, a pair of presser members 25 conveniently in the form of shafts having rolls 27 journalled thereon, which shafts preferably should point substantially radially toward the center of the tire. These are adapted to engage the tire between the two supporting rolls 19 and closely adjacent to the point where the wrapping is applied. Herein (see Fig. 2) the shafts 23 are journalled on the frame 3 and lie close to the annular portion 11 of the shuttle, being housed within the overhanging cylindrical portion 9.

The presser members have an outward position, shown in full lines in Fig. 1, in which they leave unobstructed the region in vertical alignment with the rolls 19, so as to permit a tire to be placed on these rolls without interference, as will be well understood from reference to that figure. They also have an inward position, shown in dotted lines in Fig. 1, in which they engage the tire to be wrapped. The presser members are so arranged, herein by virtue of their mounting, that when brought into the new position they will exert an inward and downward pressure on the tire, adapted to press together the edges thereof and also to hold it down on the supporting rolls 19 and offer a resistance to the pull of the wrapping strip as the tire revolves. This pressure forces together the beads of the tire while the wrapping is being applied and the parts are so arranged as to prevent concomitant bulging of the sides of the tire which would defeat to a degree the object of pressing together the beads, since the sectional form only of the tire would be deformed, without substantial diminution of the cross-sectional measurement. The presser members are therefore designed to engage the tire at its point of greatest width and extend inwardly along the flanks of the tire. In Fig. 1 we have shown a large tire in position. If the tire were smaller, the engagement of the rolls with the flanks of the tire from the point of greatest width toward the beads would be more marked.

It will be understood that when the presser members are in the inward, dotted line position shown in Fig. 1, they and the rolls 19 grip between them a short segment of the tire, the members 25 pressing down the tire on the rolls 19 and holding it securely in position. The tire is locally compressed by the inward and downward pressure of the presser members 25 immediately adjacent to the point of application of the wrapping strip; but as it passes on in its revolution it is permitted to expand, thus tensioning the wrapping.

To provide for operation of the presser members, they are herein each formed as one arm of an angular member or crank having another arm 29, the two arms 29 extending inwardly transversely to the plane of the supported tire and being interlinked, as by the pin and slot connection shown in Fig. 1. One of the shafts 23 may be provided with an operating handle 31 having at one end a finger-operated catch 33 of suitable form whereby the handle may be positioned on a retaining rack 35. Movement of the handle will rock the right hand shaft 23 and move the presser member carried thereby inwardly or outwardly, as the case may be, and by virtue of the connection of the arms 29 such movement will enforce equal and opposite movement of the other member 25.

Having thus described the illustrative embodiment of our invention shown for purposes of disclosure in the accompanying drawings, what we claim as new and desire to secure by Letters Patent we shall express in the following claims:—

1. A wrapping machine of the class described comprising a rotary shuttle, a pair of supporting rolls on opposite sides thereof for engaging an annulus exteriorly and a pair of opposed rolls between them movable to exert an inward and downward pressure on the sides of the annulus.

2. A wrapping machine of the class described comprising a rotary shuttle, a pair of supporting rolls on opposite sides thereof for engaging an annulus exteriorly, a pair of presser members between them journalled to swing across their plane in such manner that they may be moved to exert an inward and downward pressure on the annulus and means for operating said members.

3. In a machine for wrapping annular tire casings and the like, the combination of a rotary shuttle, means for supporting within the shuttle the tire casing to be wrapped, means for turning said shuttle and casing at predetermined relative rates, means for carrying wrapping material on the shuttle, and movable presser means for pressing together the two beads of the tire casing adjacent to the point at which the wrapping material is applied thereto, serving also to prevent concomitant bulging of the tire sides.

4. In a tire wrapping machine, means engaging the outside periphery of a tire casing for supporting and rotating the same, a shuttle through which said tire casing is rotated, and movable compressing means engaging the walls of said tire casing for positioning the same relative to said shuttle and supporting means.

5. In a machine for wrapping annular tire casings and the like, the combination of a rotary shuttle, rolls on opposite sides thereof to support a tire by engagement with the outer periphery thereof and movable means for holding the tire down by engagement therewith between them, said means constructed abnormally to press together the edges of the tire.

6. A wrapping machine of the class described comprising a rotary shuttle and supporting devices at opposite sides of the shuttle adapted to engage an annulus exteriorly at spaced points and support the same in vertical position for revolution through the eye of the shuttle, and movable members on opposite sides of the annulus so supported and having an outward position permitting free entrance of the annulus between them for placing the same on said devices and an inner position wherein they may transversely compress the annulus.

7. A wrapping machine of the class described comprising a rotary shuttle and supporting devices at opposite sides of the shuttle adapted to engage an annulus exteriorly at spaced points and support the same in vertical position for revolution through the eye of the shuttle, and a pair of cranked members pivoted on opposite sides of the annulus so supported which members have upright arms for engaging the annulus and other interlinked arms, and means to rock one of the members.

8. In a tire wrapping machine, means engaging the outside periphery of a tire casing for supporting and rotating the same, positioning means engaging the side walls of the tire casing, and means for moving said positioning means toward or away from each other.

9. In a wrapping machine of the class described, compressing means comprising a pair of angular members journalled adjacent the wrapping shuttle and on axes parallel to the plane of the supported annulus and having arms extending transversely of said plane and interlinked to enforce equal and opposite movement of the other arms whereby said other arms may be brought into lateral engagement with annuli to be wrapped to position the same during the wrapping operation.

10. In a tire wrapping machine, means engaging the outside of a tire casing for supporting and rotating the same, rotatable positioning means engaging the side walls of the tire casing, and means for simultaneously moving said positioning means toward or away from each other.

11. A wrapping machine for annuli comprising, in combination, a circular shuttle mounted for rotation about a substantially horizontal axis, supporting and driving means for the annulus located at opposite ends of the shuttle above the lower run thereof to sustain the annulus in an upright position for rotation about a substantially horizontal axis with its lower portion traversing the shuttle, means for imparting rotative movements to the shuttle, means for driving the supporting means to rotate the annulus and means readily movable toward or away from the annulus extending laterally of the sides of the annulus between said supporting means and adjacent the point of application of the wrapping material to maintain the plane of the annulus against the wrapping strain.

12. The combination with a tire wrapping machine, of means for supporting and rotating a tire to be wrapped, means separate from said supporting means movably mounted on the machine and extending inwardly toward the tire, and means freely rotatable on said second mentioned means for pressing the beads of the tire inwardly.

13. In a tire wrapping machine, means engaging the outside of a tire casing for rotatably supporting the same, and a plurality of independently rotatable means movably mounted on the machine for engaging the side walls of the tire casing adjacent the beads thereof whereby said tire casing is firmly held in contact with said supporting means.

14. A tire wrapping machine for annuli comprising, in combination, a rotating shuttle, a pair of supporting rolls loosely receiving the tire to support the same with a portion traversing the shuttle, means for rotating the shuttle, means for driving said rolls for revolving the tire and means separate from said driving means and adjustable to press together the beads of a tire supported on said rolls at a point between them and adjacent the point of application of the wrapping.

15. The combination with a tire wrapping machine, of means for supporting and rotating a tire to be wrapped, means separate from said supporting means pivoted on the machine and extending inwardly toward the tire, and means freely rotatable on said second mentioned means for pressing the beads of the tire inwardly.

In testimony whereof, we have signed our names to this specification.

EDWARD H. ANGIER.
WILLIAM M. WHEILDON.

9. In a wrapping machine of the class described, compressing means comprising a pair of angular members journalled adjacent the wrapping shuttle and on axes parallel to the plane of the supported annulus and having arms extending transversely of said plane and interlinked to enforce equal and opposite movement of the other arms whereby said other arms may be brought into lateral engagement with annuli to be wrapped to position the same during the wrapping operation.

10. In a tire wrapping machine, means engaging the outside of a tire casing for supporting and rotating the same, rotatable positioning means engaging the side walls of the tire casing, and means for simultaneously moving said positioning means toward or away from each other.

11. A wrapping machine for annuli comprising, in combination, a circular shuttle mounted for rotation about a substantially horizontal axis, supporting and driving means for the annulus located at opposite ends of the shuttle above the lower run thereof to sustain the annulus in an upright position for rotation about a substantially horizontal axis with its lower portion traversing the shuttle, means for imparting rotative movements to the shuttle, means for driving the supporting means to rotate the annulus and means readily movable toward or away from the annulus extending laterally of the sides of the annulus between said supporting means and adjacent the point of application of the wrapping material to maintain the plane of the annulus against the wrapping strain.

12. The combination with a tire wrapping machine, of means for supporting and rotating a tire to be wrapped, means separate from said supporting means movably mounted on the machine and extending inwardly toward the tire, and means freely rotatable on said second mentioned means for pressing the beads of the tire inwardly.

13. In a tire wrapping machine, means engaging the outside of a tire casing for rotatably supporting the same, and a plurality of independently rotatable means movably mounted on the machine for engaging the side walls of the tire casing adjacent the beads thereof whereby said tire casing is firmly held in contact with said supporting means.

14. A tire wrapping machine for annuli comprising, in combination, a rotating shuttle, a pair of supporting rolls loosely receiving the tire to support the same with a portion traversing the shuttle, means for rotating the shuttle, means for driving said rolls for revolving the tire and means separate from said driving means and adjustable to press together the beads of a tire supported on said rolls at a point between them and adjacent the point of application of the wrapping.

15. The combination with a tire wrapping machine, of means for supporting and rotating a tire to be wrapped, means separate from said supporting means pivoted on the machine and extending inwardly toward the tire, and means freely rotatable on said second mentioned means for pressing the beads of the tire inwardly.

In testimony whereof, we have signed our names to this specification.

EDWARD H. ANGIER.
WILLIAM M. WHEILDON.

Certificate of Correction.

It is hereby certified that Letters Patent No. 1,599,942, granted September 14, 1926, upon the application of Edward H. Angier, of Framingham, and William M. Wheildon, of Ashland, Massachusetts, for an improvement in "Wrapping Machines," were erroneously issued to the inventors, the said "Angier" and "Wheildon," whereas said Letters Patent should have been issued to *Pierce Wrapping Machine Company, of Chicago, Illinois, a Corporation of Illinois*, said corporation being assignee, by *mesne assignments*, of the entire interest in said invention, as shown by the record of assignments in this office; and that the said Letters Patent should be read with this correction therein that the same may conform to the record of the case in the Patent Office.

Signed and sealed this 30th day of November, A. D. 1926.

[SEAL.]
M. J. MOORE,
*Acting Commissioner of Patents.*

Certificate of Correction.

It is hereby certified that Letters Patent No. 1,599,942, granted September 14, 1926, upon the application of Edward H. Angier, of Framingham, and William M. Wheildon, of Ashland, Massachusetts, for an improvement in "Wrapping Machines," were erroneously issued to the inventors, the said "Angier" and "Wheildon," whereas said Letters Patent should have been issued to *Pierce Wrapping Machine Company, of Chicago, Illinois, a Corporation of Illinois*, said corporation being assignee, by *mesne assignments*, of the entire interest in said invention, as shown by the record of assignments in this office; and that the said Letters Patent should be read with this correction therein that the same may conform to the record of the case in the Patent Office.

Signed and sealed this 30th day of November, A. D. 1926.

[SEAL.]
M. J. MOORE,
*Acting Commissioner of Patents.*